United States Patent
Rajadurai et al.

(10) Patent No.: US 11,632,235 B2
(45) Date of Patent: Apr. 18, 2023

(54) METHOD AND APPARATUS FOR HANDLING SECURITY PROCEDURE IN MC COMMUNICATION SYSTEM

(71) Applicant: Samsung Electronics Co., Ltd., Suwon-si (KR)

(72) Inventors: Rajavelsamy Rajadurai, Bengaluru (IN); Nishant Gupta, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 16/841,881

(22) Filed: Apr. 7, 2020

(65) Prior Publication Data
US 2020/0344041 A1 Oct. 29, 2020

(30) Foreign Application Priority Data

Apr. 9, 2019 (IN) .............................. 201941014221
Mar. 19, 2020 (IN) .............................. 2019 41014221

(51) Int. Cl.
| | |
|---|---|
| H04L 9/06 | (2006.01) |
| H04L 12/18 | (2006.01) |
| H04W 12/037 | (2021.01) |
| H04W 12/041 | (2021.01) |

(52) U.S. Cl.
CPC ............ H04L 9/0631 (2013.01); H04L 12/18 (2013.01); H04W 12/037 (2021.01); H04W 12/041 (2021.01)

(58) Field of Classification Search
None
See application file for complete search history.

(56) References Cited

U.S. PATENT DOCUMENTS

| | | | | |
|---|---|---|---|---|
| 6,671,810 | B1 * | 12/2003 | Jardin | H04L 63/0428 726/3 |
| 7,778,194 | B1 * | 8/2010 | Yung | H04L 47/10 370/252 |
| 9,270,703 | B1 * | 2/2016 | Clough | H04L 63/20 |
| 10,079,822 | B2 | 9/2018 | Stojanovski et al. | |
| 2008/0155645 | A1 * | 6/2008 | Hutnik | H04L 69/24 726/1 |
| 2011/0131411 | A1 * | 6/2011 | Lin | H04W 40/00 713/168 |
| 2011/0283017 | A1 * | 11/2011 | Alkhatib | H04L 12/4633 718/1 |

(Continued)

OTHER PUBLICATIONS

Motorola Solutions et al., "[33.180] R15 MCX identity clarification (mirror)", S3-190451, 3GPP TSG-SA WG3 Meeting #94, Kochi, India, Feb. 1, 2019.

(Continued)

*Primary Examiner* — Bassam A Noaman
(74) *Attorney, Agent, or Firm* — Jefferson IP Law, LLP

(57) ABSTRACT

A method for handling a security procedure in a MC communication system is provided. The method includes selecting, by a MC service server, the security procedure, including a signaling procedure parameter during a key management procedure, and indicating, by the MC service server, the selected security procedure to protect at least one MC service signaling field by including the signaling procedure parameter to at least a MC service client during the key management procedure.

14 Claims, 11 Drawing Sheets

(56) References Cited

U.S. PATENT DOCUMENTS

| | | | |
|---|---|---|---|
| 2015/0092701 A1* | 4/2015 | Horn | H04W 4/50 370/329 |
| 2016/0180114 A1* | 6/2016 | Sastry | G06F 21/85 713/189 |
| 2016/0241389 A1* | 8/2016 | Le Saint | H04L 9/14 |
| 2018/0375663 A1* | 12/2018 | Le Saint | H04L 9/088 |
| 2019/0037617 A1 | 1/2019 | Kapatralla et al. | |
| 2019/0044980 A1 | 2/2019 | Russell et al. | |
| 2020/0099789 A1* | 3/2020 | Miller | H04L 65/1046 |
| 2020/0100319 A1* | 3/2020 | Talebi Fard | H04W 8/02 |

OTHER PUBLICATIONS

Expway et al., "Usage of MBMS for MCVideo-signaling control", C1-183600, 3GPP TSG-CT WG1 Meeting #111, Osaka, Japan, May 28, 2018.

International Search Report dated Jul. 16, 2020, issued in International Patent Application No. PCT/KR2020/004733.

3rd Generation Partnership Project; Technical Specification Group Services and System Aspects; Proximity-based Services (ProSe); Security aspects (Release 15), 3GPP TS 33.303 V15.0.0, Jun. 22, 2018, pp. 1-90, XP051473871, Sophia Antipolis, France.

3rd Generation Partnership Project; Technical Specification Group Services and System Aspects; Security of the mission critical service; (Release 15), 3GPP TS 33.180, V15.4.0, Mar. 28, 2019, pp. 1-197, XP051723117, Sophia Antipolis, France.

European Search Report dated Mar. 16, 2022, issued in European Application No. 20788012.1.

3rd Generation Partnership Project, Technical Specification Group Services and System Aspects, Study on mission critical security enhancements (Release 15), 3GPP TR 33.880 V15.1.0, Mar. 28, 2018.

Indian Office Action dated May 11, 2021, issued in Indan Patent Application No. 201941014221.

* cited by examiner

METHOD AND APPARATUS FOR HANDLING SECURITY PROCEDURE IN MC COMMUNICATION SYSTEM

This application is based on and claims priority under 35 U.S.C. § 119(a) Indian patent application number 201941014221, filed on Apr. 9, 2019 and Indian patent application number 201941014221 filed on Mar. 19, 2020, in the Indian Intellectual Property Office, the disclosure of which is incorporated by reference herein in its entirety.

BACKGROUND

1. Field

The disclosure relates to a mission critical (MC) communication system. More particularly, the disclosure relate to a system, an apparatus, and a method for security procedure negotiation in the MC communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mm-Wave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required. For example, methods for easily providing services related to mission critical (MC) communication are required.

A MC communication system allows mission critical users to communicate to end users using voice, data, such as text, files, etc., and video. Encryption and/or Integrity protection is used to secure MC communication (signaling and/or media plane traffic) between the end users or between the MC Client and MC server, for which key management servers provide a key generation material (for example, user specific identity based key information). The MC communication system for the MC communications are restrictive and may allow limited set of security procedure (e.g., cryptographic mechanism, algorithm or the like) to secure the MC communication between communication peers (i.e., MC clients-MC servers, MC clients-MC clients). In the MC communication system, cryptographic mechanism may be chosen (or, selected) by a server. However, in some scenarios, the MC communication system may not provide a mechanism to indicate the selected cryptographic mechanism. In addition, in some scenarios, the MC communication system may not consider device capabilities and other dynamic parameters such as battery status, available processing and radio powers, and individual communication privacy needs or the like. These capabilities and dynamic parameters, when considered, can help in saving significant resources, both at a client slide and a network side, and at the same time maintain the level of security required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a system for a security procedure negotiation for MC service communications are provided.

Additional aspects will be set forth in part in the description which follows and, in part, will be apparent from the description, or may be learned by practice of the presented embodiments.

In an embodiment, a method for selecting a security procedure (for example, an encryption algorithm) is provided.

In an accordance with an aspect of the disclosure a method for indicating the selected security procedure to protect at least one MC service signaling field is provided. The method includes including a signaling procedure parameter to at least a MC service client during a key management procedure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
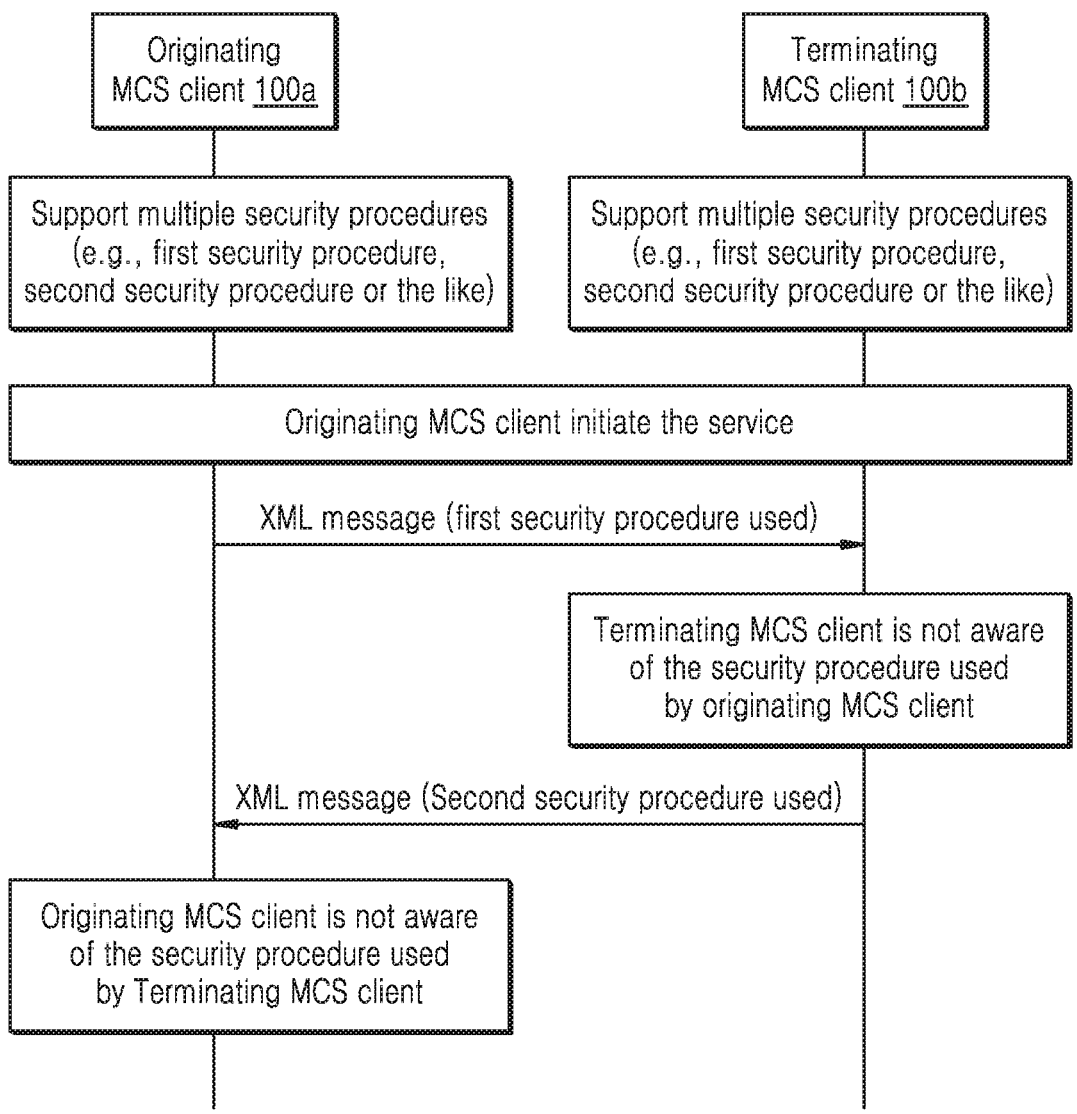
FIG. 1 illustrates a security procedure indication when XML signaling within SIP payloads is protected, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an embodiment, a method for handling a security procedure of a MC service in a MC communication system is provided. The method includes selecting, by a MC service server, the security procedure. Further, the method comprises including, by the MC service server, a signaling procedure parameter during a key management procedure. Further, the method includes indicating, by the MCservice server, the selected security procedure to protect at least one MC service signaling field by including the signaling procedure parameter to at least a MC service client during the key management procedure.

In an embodiment, the at least one MC service signaling field in the signaling message includes a MCData signaling parameter, a data signaling payload, and an end to end security parameter.

In an embodiment, the signaling procedure parameter includes a payload procedure, a signaling procedure, a message type, a date and time, a payload identifier, a payload sequence number, a MCData Payload Protection Key identifier (DPPK-ID), a payload, a MIKEY_SAKKE I-MESSAGE, and an initialisation vector for a message.

In an embodiment, the signaling procedure parameter comprises a Multimedia Internet KEYing (MIKEY) Multipurpose Internet Mail Extensions (MIME) body containing the security procedure to be used to protect the MC service signaling field.

In an embodiment, the security procedure can be, for example, but not limited to, a DP_AES_128_GCM (Galois/Counter Mode) and a DP_AES_256_GCM. In other word, the security procedure can be, for example, but not limited to, an Advanced Encryption Standard (AES) with at least one of a 128 bits key length and a 256 bits key length.

In an embodiment, the selected security procedure for protecting the at least one MC service signaling field is indicated in a signaling message.

In an embodiment, selecting, by the MC service server, the security procedure includes selecting the security procedure as a DP_AES_128_GCM, and configuring a MCPayload Cipher Key (DPCK) as 128-bits, so that 128 least significant bits of 256 bits of a Key Derivation Function (KDF) output used as a signaling protection key.

In an embodiment, selecting, by the MC service server, the security procedure includes selecting the security procedure as a DP_AES_256_GCM, and configuring an output DPCK as 256-bits and an entire output of the KDF used as a signaling protection key.

In an embodiment, the key management procedure can be a key download procedure.

In an embodiment, the security procedure is selected based on a local policy or a local configuration or the security procedure indicated in the 'CSK upload' procedure, as prescribed in 3GPP TS 33.180. The local policy or the local configuration indicate security requirements of the MC service organization.

In an embodiment, the MC service server selects the same security procedure as indicated by the MC service client in a CSK upload procedure and indicates acceptance of the MC service client proposed security procedure.

In an embodiment, the MC service server selects a different security procedure than the one indicated by the MC service client in the CSK upload procedure and indicates rejection of the MC service client proposed security method.

In an embodiment, the MC service client, performs the CSK upload procedure, to change the security procedure being used currently.

In an embodiment, the MC service server, performs the key download procedure, to change the security procedure selected in a previous key download procedure.

In an embodiment, the MC service comprises at least one a MCData service, a Mission Critical Push to Talk (MCPTT) service and a MCVideo service.

In an embodiment, a method for handling a security procedure of a MC service in a MC communication system is provided. The method includes acquiring, by a MC service client, at least one MC service signaling field indicating a selected security procedure along with a key management procedure from a MC service server. Further, the method includes using, by the MC service client, the indicated security procedure for the protection of the at least one MC service signaling field.

In an embodiment, the at least one MC service signaling field comprises a MCData signaling parameter, a data signaling payload, and an end to end security parameter.

In an embodiment, the security procedure comprises an Advanced Encryption Standard (AES) with at least one of a 128 bits key length and a 256 bits key length.

In an embodiment, a MC service server for handling a security procedure of a MC service in a MC communication system is provided. The MC service server includes a processor coupled with a memory. The processor selects the security procedure and include a signaling procedure parameter during a key management procedure. The processor indicates the selected security procedure to protect at least one MC service signaling field by including the signaling procedure parameter to at least a MC service client during the key management procedure.

In an embodiment, a MC service client for handling a security procedure of a MC service in a MC communication system is provided. The MC service client includes a processor coupled with a memory. The processor acquires at least one protected MCData signaling field indicating a selected security procure along with a key management procedure from a MC service server. Further, the processor identifies uses the indicated security procedure for the protection of the at least one MC service signaling field.

In an embodiment, a MC communication system for handling a security procedure of a MC service is provided. The MC communication system includes a MC service server and a MC service client. The MC service server selects the security procedure and includes a signaling procedure parameter during a key management procedure. The MC service server indicates the selected security procedure to protect at least one MC service signaling field by including the signaling procedure parameter to at least a MC service client. Further, the MC service client acquires the at least one protected MC service signaling field indicating the selected security procedure from the MC service server.

Further, the MC service client uses the selected security procedure for the at least one protected MCData signaling field.

In an embodiment, a method performed by a mission critical (MC) service (MCX) server in a wireless communication system is provided. The method comprises: transmitting, to a MC client, a key download message including a signaling algorithm parameter, the signaling algorithm parameter indicating an algorithm used to protect at least one MC data (MCData) signaling field information; and performing application plane signaling with the MC client using the algorithm.

In an embodiment, the at least one MCData signaling field information comprises at least one of an MCData signaling parameter, a data signaling payload, or an end to end security parameter.

In an embodiment, the algorithm is one of an advanced encryption standard (AES) with 128 bits key length algorithm (DP_AES_128_GCM) and an AES with 256 bits key length algorithm (DP_AES_258_GCM).

In an embodiment, the algorithm is DP_AES_128_GCM, and 128 bits among 256 bits of key derivation function (KDF) output are used as a MCData payload cipher key (DPCK).

In an embodiment, the algorithm is DP_AES_256_GCM, and 256 bits of key derivation function (KDF) output are used as a MCData payload cipher key (DPCK).

In an embodiment, the key download message further includes at least one key of a client-server key (CSK) or a multicast signaling key (MuSiK).

In an embodiment, the method further comprises: receiving, from the MC client, a key upload message including a client-server key (CSK); and obtaining a MCData payload cipher key (DPCK) as an output of inputting the CSK to key derivation function (KDF).

In an embodiment, the MC service provided by the application plane signaling comprises at least one of an MCData service, a mission critical push to talk (MCPTT) service, or an MC video (MCVideo) service.

In an embodiment, the key download message further includes payload of tag-length-value (TLV) format.

In an embodiment, the algorithm used to protect at least one MC data (MCData) signaling field information is different from another algorithm used to protect MCData payload field information.

In an embodiment, a method performed by a mission critical (MC) client in a wireless communication system is provided. The method comprises: receiving, from a MC service (MCX) server, a key download message including a signaling algorithm parameter, the signaling algorithm parameter indicating an algorithm used to protect at least one MC data (MCData) signaling field information; and performing application plane signaling with the MCX server using the algorithm.

In an embodiment, a mission critical (MC) service (MCX) server in a wireless communication system is provided. The MCX server comprises: transceiver; and at least one processor coupled with the transceiver, the at least one processor configured to: transmit, to a MC client, by controlling the transceiver, a key download message including a signaling algorithm parameter, the signaling algorithm parameter indicating an algorithm used to protect at least one MC data (MCData) signaling field information, and perform, by controlling the transceiver, application plane signaling with the MC client using the algorithm.

In an embodiment, a mission critical (MC) client in a wireless communication system is provided. The MC client comprises: transceiver; and at least one processor coupled with the transceiver, the at least one processor configured to: receive, from a MC service (MCX) server, by controlling the transceiver, a key download message including a signaling algorithm parameter, the signaling algorithm parameter indicating an algorithm used to protect at least one MC data (MCData) signaling field information, and perform, by controlling the transceiver, application plane signaling with the MCX server using the algorithm.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope. Likewise, the blocks of the embodiments may be physically combined into more complex blocks without departing from the scope.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms "MC client", "MC service client", "MCS client" and "MCX client" are used interchangeably in the disclosure. The terms "MC server", "MC service server", "MCS server", and "MCX server" are used interchangeably in the disclosure.

The term "security procedure" may include an encryption algorithm Or, the security procedure may correspond to the encryption algorithm.

Accordingly, embodiments herein achieve a method for handling a security procedure of a MC service in a MC communication system. The method includes selecting, by a MC service server, the security procedure. Further, the method comprising including, by the MC service server, a signaling procedure parameter during a key management procedure. Further, the method includes indicating, by the MC service server, the selected security procedure to protect at least one MC service signaling field by including the signaling procedure parameter to at least a MC service client during the key management procedure.

There may not be a method defined to indicate the crypto procedure (e.g. crypto algorithm or the like) to be used for parameters protection between a MCData client and a MCData server. MCData signaling parameters may use different Key (CSK), terminate at different entity (MC server) and can mandate different procedure compared to the MC data parameters. In an example, for MC data signaling, using 256 bits security procedure may be required, whereas for MCData, using 128 bits security procedure may be required for efficiency. However, for security procedure specified for MC services that uses protocols with tag-length-value (or, type-length-value) (TLV) format, a way to indicate the security procedure to be used to protect the signaling parameters may not be provided. If the receiver does not know which security procedure the sender used to protect the packets, then the sender and the receiver (recipient) are not coordinated and therefore may end up using different security procedure, which will break the MC communication system. Further, there may be no possibility to enforce the level of security decided by an operator and/or user, if the system lacks the security procedure negotiation/ indication. Even in the MC communication systems, where multiple cryptographic security procedures are supported, the system, due to lack of support for indications and negotiations, may limit the use of cryptographic procedure to one cryptographic security procedure for all traffic protection.

According to the disclosure, the proposed method can be used to allow negotiation of the security procedure (based on the communication peer's capability) for MCData communication while the communicating devices use TLV format protocols. The proposed method can be used to suggest to explicitly indicate the security procedure used when communicating sensitive information using TLV protocol, like so. In order to indicate the security procedure, an extension to the current TLV format is suggested by adding a dedicated information element to indicate the cryptographic security procedure used. In an embodiment, the indication can be added in the MIKEY-SAKKE payload. This information element may (or, should) be added in both, on-network and off-network communications to ensure functioning in both modes.

Further to consider device capabilities and other dynamic parameters such as battery status, available processing and radio powers, and individual communication privacy needs, the proposed method and system proposes that the MC communications systems allow negotiation of the security procedure while the communicating devices use XML or TLV format protocols (TLV-E information elements). Further, a MC service provider policy for the MC service communication can also be considered during the negotiations.

FIGS. 1 through 9, there are shown preferred according to various embodiments of the disclosure.

Referring to FIG. 1, FIG. 1 illustrates a security procedure indication when XML signaling within session initiation protocol (SIP) payloads is protected, according an embodiment. In an example, in mission critical services which use an XML protocol for communication, XML protocol headers in each packet carry an information indicating a security procedure used for the protection of a XML message. Whereas, with regard to the MC services that use protocols with TLV format, there may be no defined way to indicate the security procedure used to protect the packet/communication. If there is no method defined, then a receiver (i.e., terminating MCS client 100b) does not know which mechanism a sender (i.e., originating MCS client 100a) used to protect the packets, then the sender and the receiver are not coordinated and therefore may end up using different mechanism, which will break or damage the MC communication system.

Figure 2:
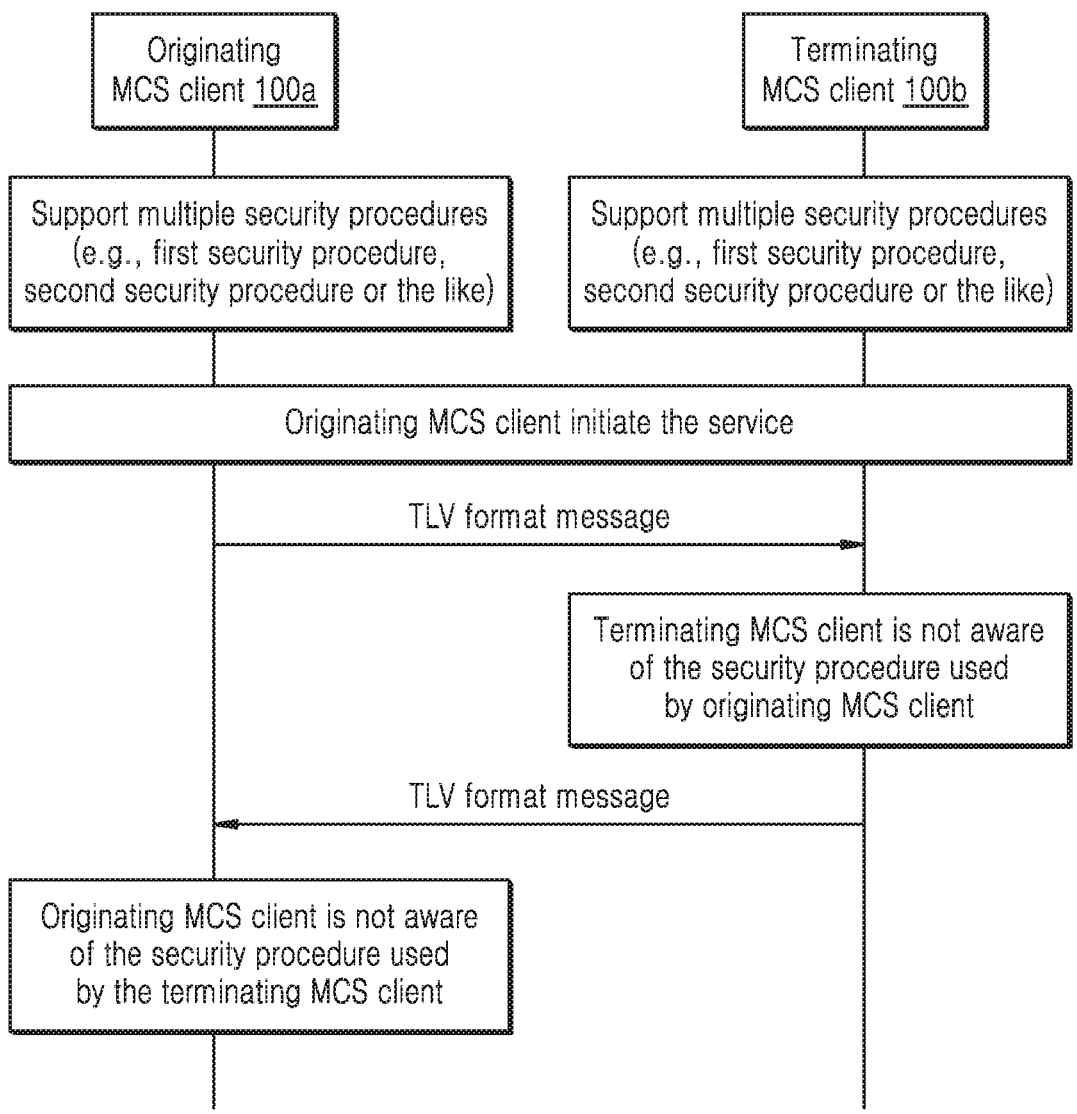
FIG. 2 illustrates a procedure using protected TLV format message within the SIP payload, according to an embodiment of the disclosure.

FIG. 2 illustrates a procedure using protected TLV format message within the SIP payload, according to an embodiment of the disclosure. In an example, in an MC communication system, the MC communication uses a XML protocol and a TLV protocol for communication of sensitive information on the signaling plane, and a Secure Real-time Transport Protocol (SRTP) and a secured Message Session Relay Protocol (MSRP) for communication on the media plane. But the system may lack indication of a cryptographic key used when communicating sensitive information using the TLV protocols, like so, as described in the FIG. 2. This will lead damage to the MC communication system.

Further, MC communication systems may also limit the use of multiple cryptographic mechanism for a service or within the MC service. Even in the MC communication systems where multiple cryptographic mechanisms are supported, the MC communication systems, due to lack of support for indications and negotiations, may limit the use of cryptographic mechanism to one cryptographic mechanisms for all traffic protection.

Thus, it is desired to address the above mentioned disadvantages or other shortcomings or at least provide a useful alternative.

Figure 3A:
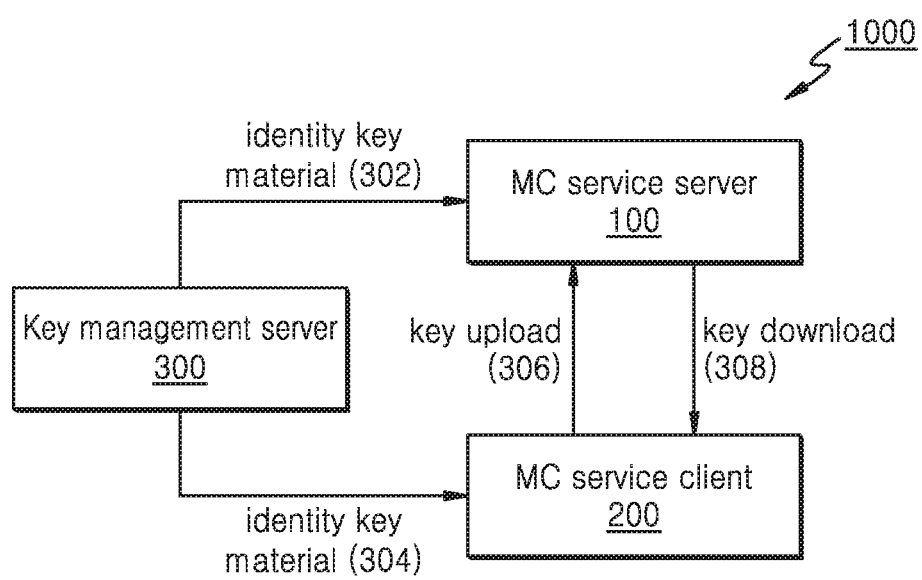
FIG. 3A is a schematic diagram of a MC communication system for handling a security procedure, according to an embodiment as disclosure.

FIG. 3A is a schematic view of a MC communication system (1000) for security procedure negotiation for MC services, according to an embodiment of the disclose. The MC services may include, for example, but not limited to, at least one of a MCData service, a Mission Critical Push to Talk (MCPTT) service, or a MCVideo service.

In an embodiment, the MC communication system (1000) may include a MC service server (100), a MC service client (200) and a key management server (300). In an embodiment, the MC service server (100) selects the security procedure. In an embodiment, the security procedure includes at least one of a encryption standard like Advanced Encryption Standard (AES) with at least one key length, a 128 bits and a 256 bits (for example, DP_AES_128_GCM (Galois/Counter Mode), a DP_AES_256_GCM like so). In an embodiment, the security procedure is selected by configuring a MCData Payload Cipher Key (DPCK) as 128-bits and 128 least significant bits of 256 bits of a Key Derivation Function (KDF) output used as a signaling protection key, when the security procedure is a AES with 128 bits key length (for example, DP_AES_128_GCM). In another embodiment, the security procedure is selected by configuring an output DPCK as 256-bits and an entire output of the KDF used as a signaling protection key, when the security procedure is a AES with 256 bits key length (for example, DP_AES_256_GCM).

In an embodiment, the MC service provided by the application plane signaling comprises at least one of an MCData service, a mission critical push to talk (MCPTT) service, or an MC video (MCVideo) service.

In an embodiment, the key download message further includes payload of tag-length-value (TLV) format.

In an embodiment, the algorithm used to protect at least one MC data (MCData) signaling field information is different from another algorithm used to protect MCData payload field information.

Figure 9:
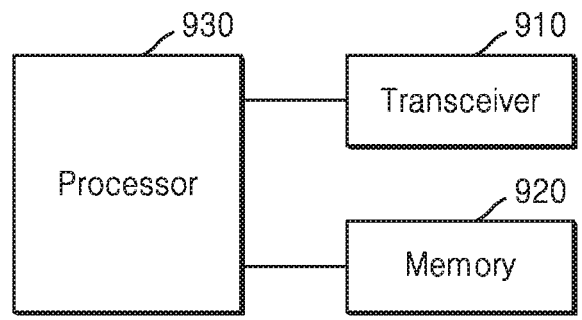
FIG. 9 illustrates an MC client according to an embodiment of the disclosure.

FIG. 9 illustrates an MC client according to an embodiment of the disclosure.

Referring to the FIG. 9, the MC client may include a processor 930, a transceiver 910 and a memory 920. However, all of the illustrated components are not essential. The MC client may be implemented by more or less components than those illustrated in FIG. 9. In addition, the processor 930 In an embodiment, the MC service server (100) may include a signaling procedure parameter in a message during a key management procedure. The key management procedure can be a key download procedure (308). Further, the MC service server (100) may indicate the selected security procedure to protect at least one MC service signaling field by including the signaling procedure parameter in a message to the MC service client (200) during the key management procedure. In an embodiment, the at least one MC service signaling field includes a MCData signaling parameter, a data signaling payload, and an end to end security parameter.

In an embodiment, the signaling procedure parameter may include an application/Multimedia Internet KEYing (MIKEY) Multipurpose Internet Mail Extensions (MIME) body containing the algorithm to be used to protect the MC service signaling fields.

In an embodiment, the MC service client (200) acquires the at least one protected MC service signaling field indicating (or, protected with) the security mechanism selected by the MC service server (100). Further, the MC service client (200) may use the indicated security procedure to protect the at least one MC service signaling field from there on.

In an embodiment, the proposed system can be used to negotiate and allow use of different security procedure (e.g., cryptographic security procedure or the like) for different requirements of the communication. For example, the security procedure used for:

i. MC signaling in a XML payload can be different from a security procedure used for MCData specific data elements in a TLV payload.

ii. MCData specific data elements in a TLV payload can be different from a security procedure used for a MCData user payload.

iii. The security procedure used while on-network can be different from the security procedure used during an off-network.

Such negotiations should be done between the communication peers before the communication. If allowed, all the negotiations can be done in a single shot (for example, within a single message exchange), or alternatively with individual requests.

In an embodiment, the MC data communication system (1000) can be used for negotiation of the security procedure between the MC client (200) and a MC server (100) involved in the MC service communication which involves the Key Management Server (KMS) (300), wherein the originating MC user at the originating MC client (200) is sending signaling messages over signaling plane to the MC server (100).

In an example, following an initial key distribution (i.e., key upload procedure 306) (e.g., CSK upload procedure), the MCX server (100) may perform a 'key download' (308) procedure (CSK and/or MuSiK download) to update the key material, and to key the client to allow multicast signaling to be protected. If the MCX server (100) selects a different security procedures compared to the MC client or newly selects the security procedure, then the MCX server (100) may include the selected security procedure along with the CSK and/or MuSiK download message (i.e., key download message), to inform the selected security procedure as shown in FIG. 3A. Then on, the MC client (200) and MCX server (100) may use the MC server (100) selected security procedure for the protection of the application plane signaling.

In an embodiment, the MC Service server (100) may use the Key Download procedure (308) to indicate or modify the algorithm used to protect the MC service signaling fields (i.e. MCData signaling parameters, Data signaling payload and End to end security parameters) by including a 'signaling algorithm' parameter. The MCX server (100) shall generate a SIP MESSAGE request in accordance with 3GPP TS 24.229 and IETF RFC 3428 and shall include an application/mikey MIME body containing the algorithm to be used to protect the MC service signaling fields along with other parameters like, the CSK-ID and the CSK encrypted within a MIKEY message, to the MC client in the body of the SIP MESSAGE request and send the SIP MESSAGE request towards the MC client (200). On receiving a CSK key download message (SIP MESSAGE request) containing an application/mikey MIME body, the MC client (200) shall extract and store the algorithm to be used to protect the MC service signaling fields. Then, the MC client (200) and MCX server (100) may use the MC server (100) indicated algorithm for the protection of the application plane signaling. For example, the MC client (200) and MCX server (100) may encrypt and decrypt messages by using the indicated algorithm.

In an embodiment, the MCX server (100) may select the security procedure based on the MC client supported security procedure which is announced by the MC client (200) along with the key upload procedure (306) or by the KMS (300) along with the identity key material (302).

In an embodiment, the MCX server (100) selected security procedure may be signed by the MCX server (100) (protected by the initiating entity) using (the KMS-provisioned key associated to) the identity of the initiating entity, as part of the CSK and/or MuSiK download protection (Key Download procedure 308). For CSK and/or MuSiK download, the signature shall use the unique ID (UID) generated from the identifier associated with MCX Server Domain Security Identifier (MDSI) of the MCX Domain. By doing so, the MC data service client (200) ay ensure that the integrity of security procedure selection is protected against manipulation.

In an embodiment, the MCX server (100) may provide list of security procedures and their applicability to the MC client (200) over the SIP interface (Key Download procedure). For example, the security procedures and their applicability may be:

a. 128-bit AES in CTR mode for encryption of the signaling message protection.

b. 128-bit AES in CMAC mode for integrity protection of the signaling message.

c. AEAD_AES_128_GCM security procedure for protection of media plane traffic.

In an embodiment, if the security procedure and its applicability are not mentioned, then the MC client (200) and the MCX server (100) may use the MC client selected security procedure for all communication protection.

In an embodiment, after the MC client (200) has obtained user authorization to access the MCX domain, the MC client (200) may obtain key material associated with the user's identity using the authorization token. The identity keys are required to support key distribution for application signaling, floor control, transmission control and media. The identity key material may be obtained from the KMS (300), via an HTTP request. On receiving the request, in addition to the key material associated with the user's identity, the KMS may provide the selected security procedure and their applicability, such as for the application plane signaling between the MC client (200) and the MCX server (100) in the identity key material message (304). The cryptographic security procedure may be selected based on the communication peer's security capabilities and/or based on the MC service provider policy. On receiving the key material message (304) which includes the selected security procedure, the MC client (200) and the MCX server (100) may use the selected security procedure for indicated purposes (if indicated; if there is no indication, then the same security procedure is used for all communications), such as for the protection of application plane signaling, which uses TLV elements.

In an embodiment, the security capabilities may include supported security procedure for the application plane signaling security and the size of the security key. In an embodiment, the KMS (300) may be preconfigured with the MC client supported security procedure and may provide the list of supported security procedure to the MCX server (100) to down select the security procedure based on policy.

The "selected security procedure(s)" may include at least one of the selected cryptographic security procedure used for Integrity protection, another selected cryptographic security procedure used for encryption (ciphering), or a security procedure used for both Integrity protection and encryption (ciphering). The "selected security procedure(s)" may also include the information on the key length to be used.

In an embodiment, the application plane signaling security may protect application signaling between the MC client (200) and the MCX server (100). Initial key distribution for application signaling may be performed by sending a client-server key (CSK) from the MC client (200) to the MCX server (100) over the SIP interface (CSK/Key upload). The key may be secured using the identity key material provisioned by the key management server (300). Along with the protected CSK, the MC client (200) may include the selected security procedure and also may include the list of supported security procedure (as to announce supported security procedure), in a key upload procedure (306). Then on, the MC client (200) and MCX server (100) may use the MC client selected security procedure for the protection of the application plane signaling.

In an embodiment, the MC client selected security procedure and the optional list of supported security procedure may be signed by the MC client (protected by the initiating entity) using (the KMS-provisioned key associated to) the identity of the initiating entity, as part of the CSK upload protection. For CSK Upload, the signature shall use the UID generated from the identifier associated with MC Service user ID associated with the initiating user. By doing so, the MC client (200) may ensure that the integrity of security procedure selection is protected against manipulation.

In an embodiment, the MC client (200) may provide list of security procedure and their applicability to the MCX server (100) over the SIP interface (Key upload) procedure (306). For example, the security procedures and their applicability may be:

a. 128-bit AES in CTR mode for encryption of the signaling message protection.

b. 128-bit AES in CMAC mode for integrity protection of the signaling message.

c. AEAD_AES_128_GCM security procedure for protection of media plane traffic.

In an embodiment, separate message exchange may be used for the negotiation of cryptographic security procedure (s), between the MC client (200) and the MCX server (100). The MC client (200) may send the list of supported security procedure to the MCX server (100) or it may be announced by the KMS to the MCX server (100). The MCX server (100) may select the security procedure to use based on, for example, the security capabilities of the MC client (200) and the configured allowed list of security capabilities of the MCX domain. The security capabilities may include supported security procedure for the application plane signaling security and/or the size of the security key. Then the selected security procedure may be indicated to the MC client (200) in a protected manner, such that the MC client (200) is ensured that the integrity of security procedure selection is protected against manipulation.

In an embodiment, the selected security procedure may be indicated with its applicability, if the server/peer decided to use a different security procedures for different traffic/plane. If no indication is provided, then the selected security procedure are used for the protection of all traffic between the peers.

In an embodiment, the MC client (200) and the MCX server (100) may implicitly derive the security procedure to be used based on the key length (or key size). For illustrative purpose, if the MC client (200) and the MCX server (100) supports two security procedures, namely AES_128_GCM and AES_256_GCM, then the MC client (200) and the MCX server (100) may implicitly derive the security procedure to be used based on the CSK length in the "key upload" (306) or in the "key download" (308). If the CSK length is 256 bits, then the MC client (200) and the MCX server (100) may select and use the AES_256_GCM security procedure for the protection of the application plane signaling.

The embodiments mentioned above can be combined together to perform security procedure negotiation. In an embodiment, protection means Integrity protection and/or confidentiality protection (encryption/ciphering).

Figure 3B:
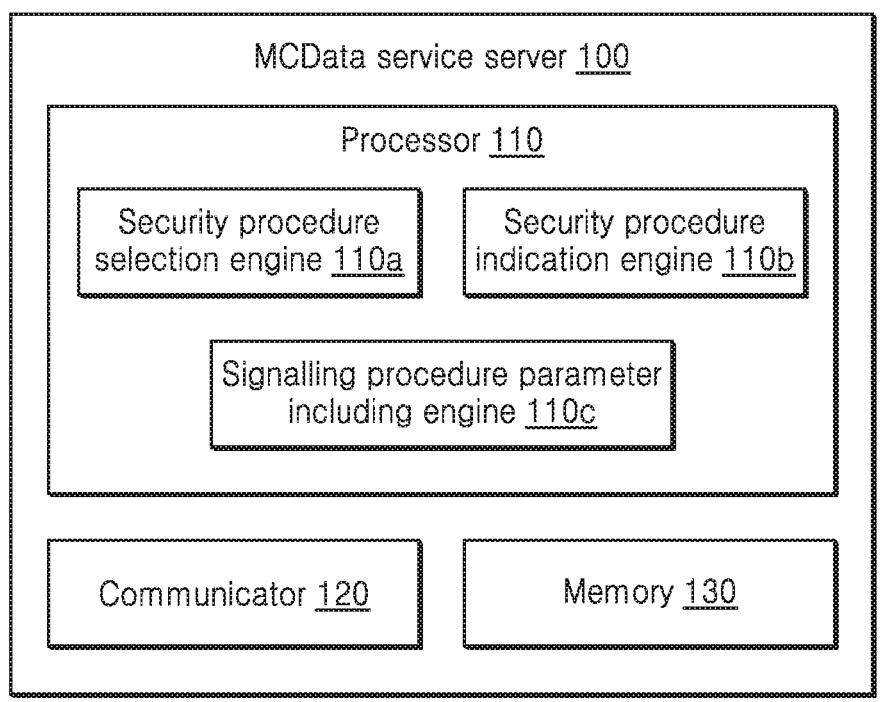
FIG. 3B illustrates a MC service server for handling the security procedure, according to an embodiment of the disclosure.

FIG. 3B illustrates an MC service server (100) for handling the security procedure of the MC service, according to an embodiment of the disclose. The MC service server (100) comprises a processor (110), a communicator (120), and a memory (130). The processor (110) is coupled with the communicator (120) and the memory (130). In an embodiment, the processor (110) includes a security procedure selection engine (110a), a security procedure indication engine (110b), and a signaling procedure parameter including engine (110c)

In an embodiment, the security procedure selection engine (110a) selects the security procedure. Further, the signaling procedure parameter including engine (110c) includes the signaling procedure parameter in a message during a key management procedure. Further, the security procedure indication engine (110b) indicates the selected security procedure to protect at least one MC service signaling field by including the signaling procedure parameter in the message to at least a MC service client (200) during the key management procedure.

The processor (110) is configured to execute instructions stored in the memory (130) and to perform various processes. The communicator (120) is configured for communicating internally between internal hardware components and with external devices via one or more networks.

Further, the memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Figure 3C:
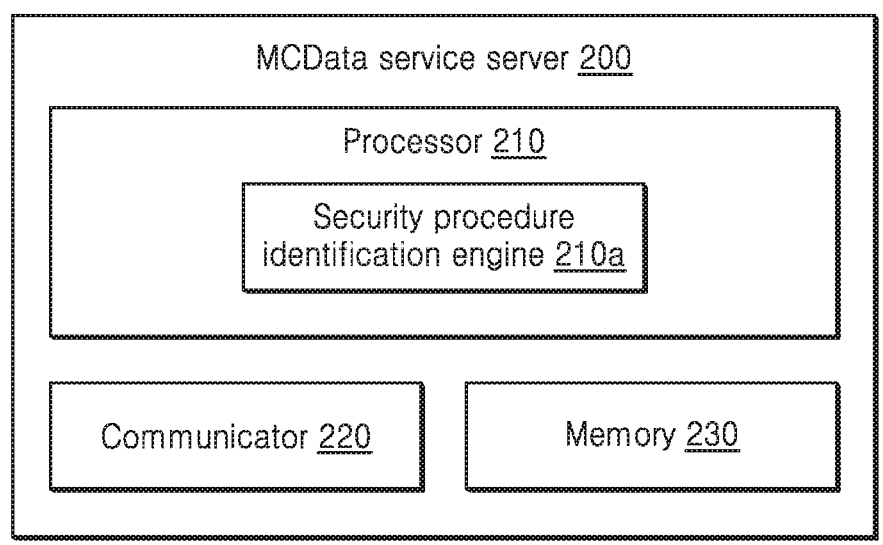
FIG. 3C illustrates a MC communication client for handling the security procedure, according to an embodiment of the disclosure.

FIG. 3C illustrates an MC communication client (200) for handling a security procedure of the MC service, according to an embodiment of the disclose. The MC communication client (200) comprises a processor (210), a communicator (220) and a memory (230). The processor (210) is coupled with the communicator (220) and the memory (230). The processor (210) includes a security procedure identification engine (210a). The security procedure identification engine (210a) acquires the at least one protected MC service signaling field indicating (or, protected with) the selected security procedure along with a key management procedure from the MC service server (100). The security procedure identification engine (210a) may acquire indication of the selected security procedure included in a key download message from the MC service server (100).

The processor (210) is configured to execute instructions stored in the memory (230) and to perform various processes. The communicator (220) is configured for communicating internally between internal hardware components and with external devices via one or more networks.

Further, the memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In some examples, the memory (230) can be configured to store larger amounts of information than the memory. In certain examples, a non-transitory storage medium may store data that can, over time, change (e.g., in Random Access Memory (RAM) or cache).

Figure 4:
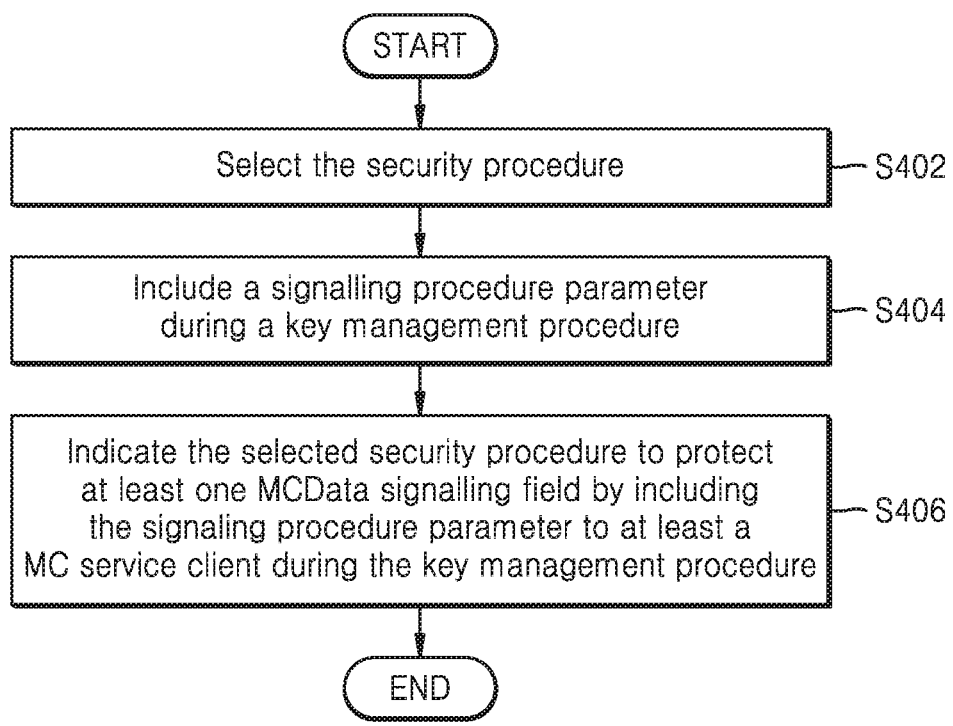
FIG. 4 is a flow chart illustrating a method, implemented by the MC service server, for handling the security procedure of a MC service in the MC communication system, according to an embodiment of the disclosure.

FIG. 4 is a flow chart illustrating a method, implemented by the MC service server (100), for handling the security procedure of the MC service in the MC communication system (1000), according to an embodiment as disclosed herein. The operations (S402-S406) are performed by the processor (110). At S402, the method includes selecting the security procedure. At S404, the method comprises including the signaling procedure parameter during the key management procedure. At S406, the method includes indicating the selected security procedure to protect the at least one MC service signaling field by including the signaling procedure parameter to at least a MC service client (200) during the key management procedure.

Figure 5:
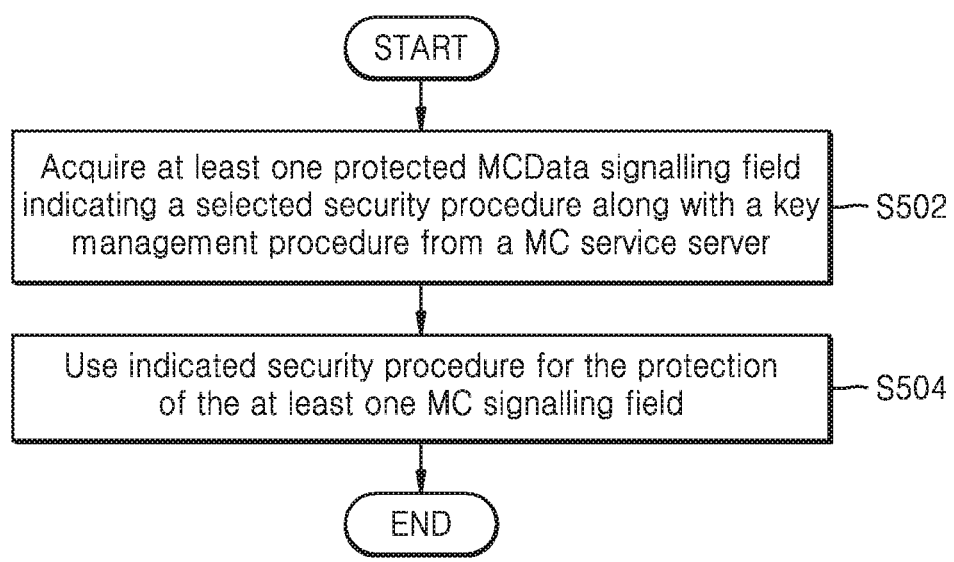
FIG. 5 is a flow chart illustrating a method, implemented by the MC service client, for handling the security procedure of the MC service in the MC communication system, according to an embodiment of the disclosure.

FIG. 5 is a flow chart illustrating a method, implemented by the MC service client (200), for handling the security procedure of the MC service in the MC communication system (1000), according to an embodiment as disclosed herein. The operations (S502 and S504) are performed by the processor (210).

At S502, the method includes acquiring the least one protected MC service signaling field indicating (or, protected with) the selected security procedure along with the key management procedure from the MC service server (100). At S504, the method includes using the indicated security procedure for protecting the one protected MC service signaling field.

Figure 6:
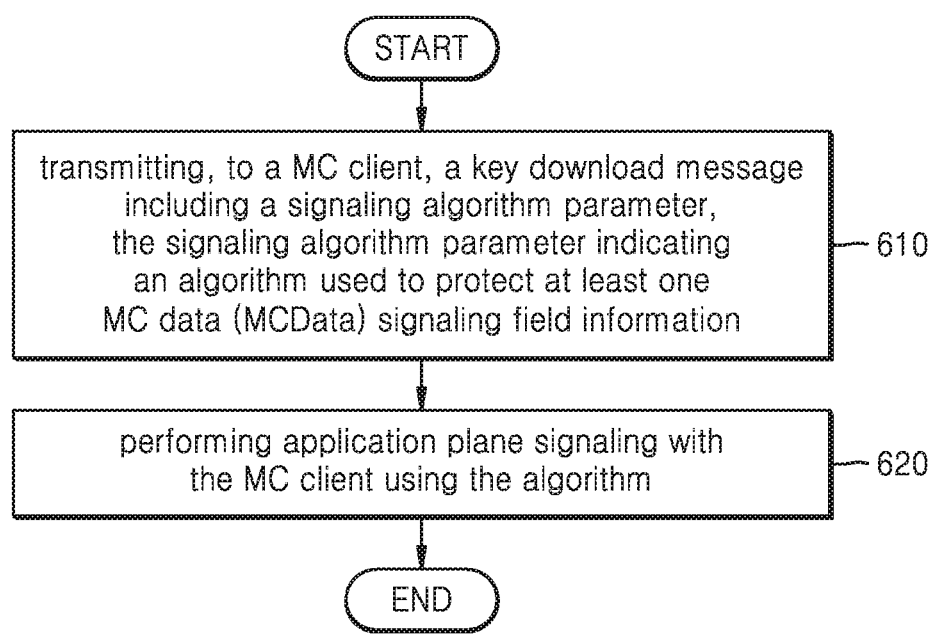
FIG. 6 is a flow chart illustrating a method of handling security procedure of MC service performed by an MCX server according to an embodiment of the disclosure.

FIG. 6 is a flow chart illustrating a method of handling security procedure of MC service performed by an MCX server according to an embodiment of the disclosure.

Referring to FIG. 6, in operation 610, the MCX server transmits, to a MC client, a key download message including a signaling algorithm parameter. The signaling algorithm parameter indicates an algorithm used to protect at least one MC data (MCData) signaling field information.

In operation 620, the MCX server performs application plane signaling with the MC client using the algorithm used to protect the at least one MCData signaling field information. For example, the MCX server may transmit an application plane signaling message to the MC client and receive another application plane signaling message from the MC client by using the indicated algorithm. The MCX server and the MC client may use the indicated algorithm to encrypt and decrypt the protected messages.

Figure 7:
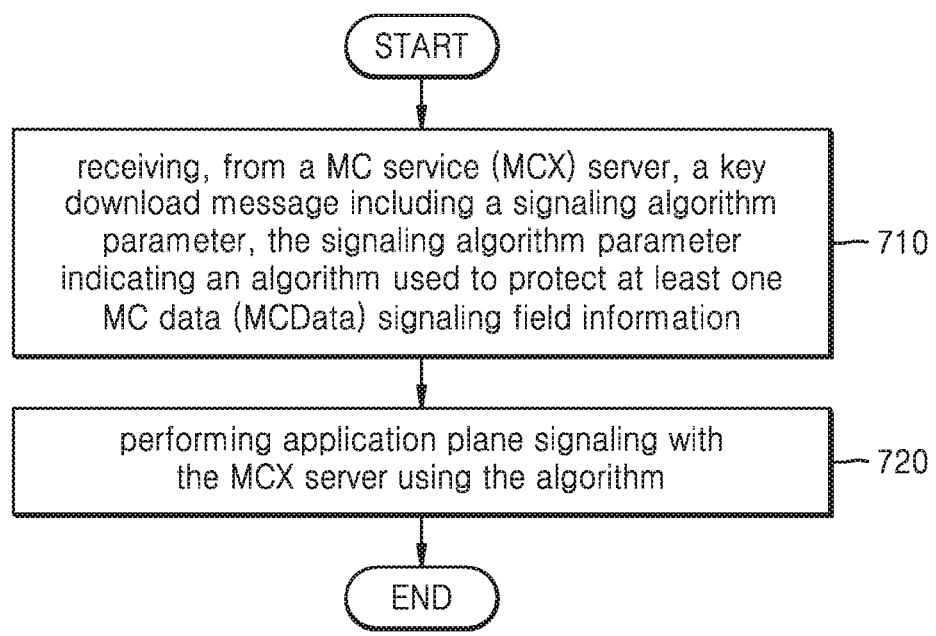
FIG. 7 is a flow chart illustrating a method of handling security procedure of MC service performed by an MC client according to an embodiment of the disclosure.

FIG. 7 is a flow chart illustrating a method of handling security procedure of MC service performed by an MC client according to an embodiment of the disclosure.

Referring to FIG. 7, in operation 710, the MC client receives, from a MC service (MCX) server, a key download message including a signaling algorithm parameter. The signaling algorithm parameter indicates an algorithm used to protect at least one MC data (MCData) signaling field information.

In operation 720, the MC client performs application plane signaling with the MCX server using the algorithm used to protect the at least one MCData signaling field information. For example, the MC client may receive an application plane signaling message from the MCX server and transmit another application plane signaling message to the MCX server by using the indicated algorithm. The MCX server and the MC client may use the indicated algorithm to encrypt and decrypt the protected messages.

Figure 8:
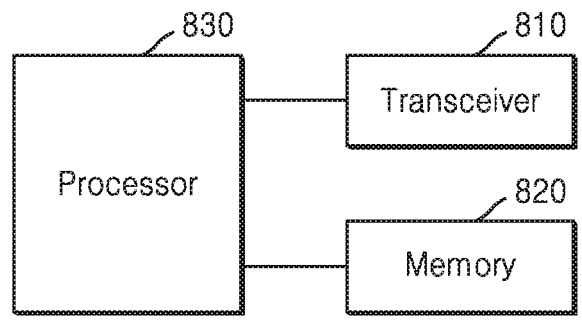
FIG. 8 illustrates an MCX server according to an embodiment of the disclosure.

FIG. 8 illustrates an MCX server according to an embodiment of the disclosure.

Referring to the FIG. 8, the MCX server may include a processor 830, a transceiver 810 and a memory 820. However, all of the illustrated components are not essential. The MCX server may be implemented by more or less components than those illustrated in FIG. 8. In addition, the processor 830 and the transceiver 810 and the memory 820 may be implemented as a single chip according to another embodiment.

The aforementioned components will now be described in detail.

The transceiver 810 may include a RF transmitter for up-converting and amplifying a transmitted signal, and a RF receiver for down-converting a frequency of a received signal. However, according to another embodiment, the transceiver 810 may be implemented by more or less components than those illustrated in components.

The transceiver 810 may be connected to the processor 830 and transmit and/or receive a signal. The signal may include control information and data. In addition, the transceiver 810 may receive the signal through a wireless channel and output the signal to the processor 830. The transceiver 810 may transmit a signal output from the processor 830 through the wireless channel.

The memory 820 may store the control information or the data included in a signal obtained by the MCX server. The memory 820 may be connected to the processor 830 and store at least one instruction or a protocol or a parameter for the proposed function, process, and/or method. The memory 820 may include read-only memory (ROM) and/or random access memory (RAM) and/or hard disk and/or CD-ROM and/or DVD and/or other storage devices.

The processor 830 may include one or more processors or other processing devices that control the proposed function, process, and/or method. Operation of the MCX server may be implemented by the processor 830.

The processor 830 may control the transceiver 810 to receive a message from a MC client and transmit another message to the MC client.

In an embodiment, the processor 830 may transmit, by controlling the transceiver 810, to a MC client, a key download message including a signaling algorithm parameter, the signaling algorithm parameter indicating an algorithm used to protect at least one MC data (MCData) signaling field information, and perform, by controlling the transceiver 810, application plane signaling with the MC client using the algorithm.

In an embodiment, the at least one MCData signaling field information comprises at least one of an MCData signaling parameter, a data signaling payload, or an end to end security parameter.

In an embodiment, the algorithm is one of an advanced encryption standard (AES) with 128 bits key length algorithm (DP_AES_128_GCM) and an AES with 256 bits key length algorithm (DP_AES_258_GCM).

In an embodiment, the algorithm is DP_AES_128_GCM, and 128 bits among 256 bits of key derivation function (KDF) output are used as a MCData payload cipher key (DPCK).

In an embodiment, the algorithm is DP_AES_256_GCM, and 256 bits of key derivation function (KDF) output are used as a MCData payload cipher key (DPCK).

In an embodiment, the key download message further includes at least one key of a client-server key (CSK) or a multicast signaling key (MuSiK).

In an embodiment, the processor 830 may receive, from the MC client, by controlling the transceiver 810, a key upload message including a client-server key (CSK), and obtain a MCData payload cipher key (DPCK) as an output of inputting the CSK to key derivation function (KDF).

and the transceiver 910 and the memory 920 may be implemented as a single chip according to another embodiment.

The aforementioned components will now be described in detail.

The transceiver 910 may include a RF transmitter for up-converting and amplifying a transmitted signal, and a RF receiver for down-converting a frequency of a received signal. However, according to another embodiment, the transceiver 910 may be implemented by more or less components than those illustrated in components.

The transceiver 910 may be connected to the processor 930 and transmit and/or receive a signal. The signal may include control information and data. In addition, the transceiver 910 may receive the signal through a wireless channel and output the signal to the processor 930. The transceiver 910 may transmit a signal output from the processor 930 through the wireless channel.

The memory 920 may store the control information or the data included in a signal obtained by the MC client. The memory 920 may be connected to the processor 930 and store at least one instruction or a protocol or a parameter for the proposed function, process, and/or method. The memory 920 may include read-only memory (ROM) and/or random access memory (RAM) and/or hard disk and/or CD-ROM and/or DVD and/or other storage devices.

The processor 930 may include one or more processors or other processing devices that control the proposed function, process, and/or method. Operation of the MC client may be implemented by the processor 930.

The processor 930 may control the transceiver 910 to receive a message from a MCX server and transmit another message to the MCX server.

In an embodiment, the processor 930 may receive, from a MC service (MCX) server, by controlling the transceiver, a key download message including a signaling algorithm parameter, the signaling algorithm parameter indicating an algorithm used to protect at least one MC data (MCData) signaling field information, and perform, by controlling the transceiver, application plane signaling with the MCX server using the algorithm.

The embodiments disclosed herein can be implemented using at least one software program running on at least one hardware device and performing network management functions to control the elements.

While the disclose has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a mission critical (MC) service (MCX) server in a wireless communication system, the method comprising:
selecting, from among a plurality of signaling algorithms, a signaling algorithm used to protect at least one MC data (MCData) signaling field including an MCData signaling parameter, a data signaling payload, and an end to end security parameter, based on a local policy or requirement information, the local policy or the requirement information being associated with a key length, wherein the at least one MCData signaling field is included in a message using a tag-length-value (TLV) format;
transmitting, to an MC client, a key download message including a signaling algorithm parameter indicating the signaling algorithm; and performing application plane signaling with the MC client by using the signaling algorithm,
wherein the performing includes encrypting or decrypting the message using the TLV format by using the signaling algorithm indicated by the key download message, and
wherein the signaling algorithm is different from an algorithm used to protect an MCData payload associated with a user payload.

2. The method of claim 1, wherein the signaling algorithm is selected as one of an advanced encryption standard (AES) with 128 bits key length algorithm (DP_AES_128_GCM) and an AES with 256 bits key length algorithm (DP_AES_256_GCM).

3. The method of claim 2, wherein in case that the signaling algorithm is selected as the DP_AES_128_GCM, 128 bits among 256 bits of a key derivation function (KDF) output are used as an MCData payload cipher key (DPCK).

4. The method of claim 2, wherein in case that the signaling algorithm is selected as the DP_AES_256_GCM, 256 bits of a key derivation function (KDF) output are used as an MCData payload cipher key (DPCK).

5. The method of claim 1, wherein the key download message further includes a client-server key (CSK) or a multicast signaling key (MuSiK).

6. The method of claim 1, further comprising:
receiving, from the MC client, a key upload message including a client-server key (CSK); and
obtaining an MCData payload cipher key (DPCK) as an output of inputting the CSK to a key derivation function (KDF).

7. The method of claim 1, wherein an MC service provided by the application plane signaling comprises at least one of an MCData service, a mission critical push to talk (MCPTT) service, or an MC video (MCVideo) service.

8. A method performed by a mission critical (MC) client in a wireless communication system, the method comprising:
receiving, from an MC service (MCX) server, a key download message including a signaling algorithm parameter indicating a signaling algorithm used to protect at least one MC data (MCData) signaling field including an MCData signaling parameter, a data signaling payload, and an end to end security parameter, wherein the at least one MCData signaling field is included in a message using a tag-length- value (TLV) format, and wherein the signaling algorithm is selected, from among a plurality of signaling algorithms, based on a local policy or requirement information, the local policy or the requirement information being associated with a key length; and
performing application plane signaling with the MCX server by using the signaling algorithm,
wherein the performing includes encrypting or decrypting the message using the TLV format by using the signaling algorithm indicated by the key download message, and wherein the signaling algorithm is different from an algorithm used to protect an MCData payload associated with a user payload.

9. The method of claim 8, wherein the signaling algorithm is selected as one of an advanced encryption standard (AES) with 128 bits key length algorithm (DP_AES_128_GCM) and an AES with 256 bits key length algorithm (DP_AES_256_GCM).

10. A mission critical (MC) service (MCX) server in a wireless communication system, the MCX server comprising:
a transceiver; and
at least one processor configured to:
select, from among a plurality of signaling algorithms, a signaling algorithm used to protect at least one MC data (MCData) signaling field including an MCData signaling parameter, a data signaling payload, and an end to end security parameter, based on a local policy or requirement information, the local policy or the requirement information being associated with a key length, wherein the at least one MCData signaling field is included in a message using a tag-length-value (TLV) format,
transmit, to an MC client via the transceiver, a key download message including a signaling algorithm parameter indicating the signaling algorithm, and
perform, via the transceiver, application plane signaling with the MC client by using the signaling algorithm,
wherein the performing includes encrypting or decrypting the message using the TLV format by using the signaling algorithm indicated by the key download message, and
wherein the signaling algorithm is different from an algorithm used to protect an MCData payload associated with a user payload.

11. The MCX server of claim 10, wherein the signaling algorithm is selected as one of an advanced encryption standard (AES) with 128 bits key length algorithm (DP_AES_128_GCM) and an AES with 256 bits key length algorithm (DP_AES256_GCM).

12. The MCX server of claim 11, wherein in case that the signaling algorithm is selected as DP_AES_128_GCM, 128 bits among 256 bits of a key derivation function (KDF) output are used as an MCData payload cipher key (DPCK).

13. The MCX server of claim 11, wherein in case that the signaling algorithm is selected as the DP_AES_256_GCM, 256 bits of a key derivation function (KDF) output are used as an MCData payload cipher key (DPCK).

14. A mission critical (MC) client in a wireless communication system, the MC client comprising:
a transceiver; and
at least one processor configured to:
receive, from an MC service (MCX) server via the transceiver, a key download message including a signaling algorithm parameter indicating a signaling algorithm used to protect at least one MC data (MCData) signaling field including an MCData signaling parameter, a data signaling payload, and an end to end security parameter, wherein the at least one MCData signaling field is included in a message using a tag-length-value (TLV) format, and wherein the signaling algorithm is selected, from among a plurality of signaling algorithms, based on a local policy or requirement information, the local policy or the requirement information being associated with a key length, and
perform, via the transceiver, application plane signaling with the MCX server by using the signaling algorithm,
wherein the performing includes encrypting or decrypting the message using the TLV format by using the signaling algorithm indicated by the key download message, and
wherein the signaling algorithm is different from an algorithm used to protect an MCData payload associated with a user payload.

* * * * *